(12) United States Patent
Cheng et al.

(10) Patent No.: US 8,413,015 B2
(45) Date of Patent: Apr. 2, 2013

(54) NONVOLATILE MEMORY CONTROLLER WITH SCALABLE PIPELINED ERROR CORRECTION

(75) Inventors: Steven S. Cheng, Sunnyvale, CA (US); Aruna Gutta, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 698 days.

(21) Appl. No.: 12/563,455

(22) Filed: Sep. 21, 2009

(65) Prior Publication Data

US 2011/0072328 A1    Mar. 24, 2011

(51) Int. Cl.
*G11C 29/00* (2006.01)
(52) U.S. Cl. ........................................................ 714/763
(58) Field of Classification Search .................. 714/763, 714/768, 773
See application file for complete search history.

(56) References Cited

U.S. PATENT DOCUMENTS

| | | | |
|---|---|---|---|
| 6,848,070 B1 | 1/2005 | Kumar | |
| 6,931,582 B2 * | 8/2005 | Tamura et al. | 714/758 |
| 7,103,820 B2 | 9/2006 | Polk, Jr. et al. | |
| 7,516,371 B2 * | 4/2009 | Sakaue et al. | 714/52 |
| 7,546,515 B2 | 6/2009 | Gross et al. | |
| 7,609,557 B2 * | 10/2009 | Aritome | 365/185.22 |
| 7,774,683 B2 * | 8/2010 | Keays et al. | 714/765 |
| 8,078,941 B2 * | 12/2011 | Aizawa | 714/773 |
| 8,091,010 B2 * | 1/2012 | Yim | 714/773 |
| 2005/0268203 A1 | 12/2005 | Keays et al. | |
| 2007/0047305 A1 * | 3/2007 | Conley | 365/185.05 |
| 2007/0266295 A1 | 11/2007 | Conley | |
| 2008/0092026 A1 | 4/2008 | Brandman et al. | |
| 2008/0222491 A1 * | 9/2008 | Lee et al. | 714/763 |
| 2008/0307285 A1 | 12/2008 | Kim et al. | |
| 2009/0063934 A1 * | 3/2009 | Jo | 714/764 |
| 2011/0041039 A1 * | 2/2011 | Harari et al. | 714/773 |
| 2011/0307762 A1 * | 12/2011 | Tiziani et al. | 714/768 |

FOREIGN PATENT DOCUMENTS

EP    1286359    2/2003

OTHER PUBLICATIONS

Cardinal Search Report, "2001.16 Scalable Pipelined ECC," prepared Jan. 12, 2009. Cardinal Intellectual Property, Inc.
Cardinal Search Report, "2001.16 Scalable Pipelined ECC," prepared Feb. 18, 2009. Cardinal Intellectual Property, Inc.
Chelton, William and Benaissa, Mohammed, "High-Speed Pipelined ECC Processor on FPGA," University of Sheffield, UK, 2006. 1-4244-0383-9. (Downloaded on Jan. 10, 2009 form IEEE Xplore.).
Kamabe, Hiroshi and Katou, Hironori, "Integrated Interleaving ECC and High Dimensional Parity Codes," Gifu University, Japan, 2005. (Downloaded on Jan. 10, 2009 form IEEE Xplore.).
International Search Report and Written Opinion dated Dec. 17, 2010 for PCT Application No. PCT/US2010/048371.
International Preliminary Report on Patentability dated Mar. 27, 2012 issued in PCT/US2010/048371.

* cited by examiner

*Primary Examiner* — James C Kerveros
(74) *Attorney, Agent, or Firm* — Weaver Austin Villeneuve & Sampson, LLP

(57) ABSTRACT

A nonvolatile memory system includes a memory controller in communication with multiple memory dies through multiple memory interfaces. Multiple ECC blocks are provided to decode data from the multiple memory interfaces. ECC blocks are provided with a clock signal that may have a frequency that is lower than another clock signal that is provided to a host interface.

12 Claims, 6 Drawing Sheets

NONVOLATILE MEMORY CONTROLLER WITH SCALABLE PIPELINED ERROR CORRECTION

BACKGROUND OF THE INVENTION

This invention relates to nonvolatile memories and memory controllers. In particular, this application relates to nonvolatile memory controllers that perform Error Correction Coding (ECC) on data that is written to or read from a nonvolatile memory.

Nonvolatile memory systems are used in various applications. Some nonvolatile memory systems are embedded in a larger system such as a personal computer, for example as a Solid State Drive (SSD). Other nonvolatile memory systems are removably connected to a host system and may be interchanged between different host systems. Examples of such removable nonvolatile memory systems include memory cards, USB flash drives, and removable SSDs. Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Several of the same type of card may be interchanged in a host card slot designed to accept that type of card. However, the development of the many electronic card standards has created different types of cards that are incompatible with each other in various degrees. A card made according to one standard is usually not useable with a host designed to operate with a card of another standard. Memory card standards include PC Card, CompactFlash™ card (CF™ card), SmartMedia™ card, MultiMediaCard (MMC™), Secure Digital (SD) card, a miniSD™ card, Subscriber Identity Module (SIM), Memory Stick™, Memory Stick Duo card and microSD/TransFlash™memory module standards. There are several USB flash drive products commercially available from SanDisk Corporation under its trademark "Cruzer®." USB flash drives are typically larger and shaped differently than the memory cards described above.

Different types of memory array architecture are used in nonvolatile memory systems. In one type of architecture, a NAND array, a series of strings of more than two memory cells, such as 16 or 32, are connected along with one or more select transistors between individual bit lines and a reference potential to form columns of cells. Word lines extend across cells within a large number of these columns.

In a common arrangement, a memory controller may perform Error Correction Coding ("ECC") functions on data that is written to and read from a nonvolatile memory array. The term ECC is used throughout this specification to refer to both encoding and decoding of data according to a particular code, where decoding includes at least detection of errors and may also include correction of ECC correctable errors. FIG. 1 shows an example of a removable nonvolatile memory system 100 of the prior art that includes a memory controller 102 that is in communication with two memory chips 104a, 104b over a memory bus 106. The controller is also in communication with a host interface 108 that provides a connection to a host in a standardized manner. The memory controller 102 is formed on a dedicated chip or Application Specific Integrated Circuit ("ASIC"), which is separate from the nonvolatile memory chips. The controller performs ECC functions on data going to and from the memory arrays. For example, when data is received from a host to be stored in the memory array, the controller may perform ECC encoding, which generally adds a level of redundancy to the data before the data is stored in the memory array. Subsequently, when the data is read from the memory array, the data is decoded to obtain the original data. Errors in the data may be detected and corrected (within some limits). In some memories, such ECC functions may cause a bottleneck that affects overall system performance.

SUMMARY OF THE INVENTION

An example of a nonvolatile memory system includes a memory controller that has two or more separate ECC blocks to separately perform ECC operations on data in parallel. The data for each ECC block may come from a different memory interface. ECC blocks may be run using relatively low clock speeds so that ECC circuits do not necessarily need to be designed to the more demanding standards required for higher clock speeds. ECC blocks may also share clock signals with other memory controller components that operate at relatively slow speeds, which may include memory interfaces. Other higher frequency clock signals may be provided to such components as the host interface.

According to an embodiment, a removable nonvolatile memory system includes: a first nonvolatile memory chip; a second nonvolatile memory chip; a controller chip that has a first memory interface in communication with the first memory chip and a second memory interface in communication with the second memory chip, the first memory interface connected to a first Error Correction Coding ("ECC") block that is dedicated to the first memory interface, and the second memory interface connected to a second ECC block that is dedicated to the second memory interface; and a host interface that is in communication with both the first ECC block and the second ECC block.

A removable nonvolatile memory system may be contained in a memory card, for example, a memory card having a host interface that complies with one of the following standards: PC Card, CompactFlash card, SmartMedia card, MultiMediaCard, Secure Digital card, a miniSD card, Subscriber Identity Module, Memory Stick, Memory Stick Duo card, microSD/TransFlash, AT-Attachment (ATA), Serial ATA (SATA), Parallel ATA (PATA), Peripheral Component Interconnect (PCI), mini-PCI, or Firewire. The removable nonvolatile memory may be contained in a Universal Serial Bus ("USB") flash drive, or may form a Solid State Drive. A removable nonvolatile memory system may use NAND flash memory chips. A removable nonvolatile memory system may include a first clock signal that is provided to the first ECC block and the second ECC block; and a second clock signal that is provided to the host interface, the second clock signal having a higher frequency than the first clock signal.

According to an embodiment, a method of performing error correction in a removable nonvolatile memory system includes: receiving a first stream of encoded data from a first nonvolatile memory chip in the removable nonvolatile memory system; providing the first stream of encoded data to a first Error Correction Coding ("ECC") block on a controller chip in the removable nonvolatile memory system; decoding the first stream of data in the first ECC block to obtain a first stream of decoded data; providing the first stream of decoded data to a host interface of the removable nonvolatile memory system; receiving a second stream of encoded data from a second nonvolatile memory chip in the removable nonvolatile memory system; providing the second stream of encoded data to a second ECC block on the controller chip; decoding the second stream of data in the second ECC block to obtain a second stream of decoded data; and providing the second stream of decoded data to the host interface.

A method of performing error correction in a removable nonvolatile memory system may also include: providing a first clock signal to the first ECC block and to the second ECC block; and providing a second clock signal to the host interface, providing the first clock signal to a first memory interface between the first nonvolatile memory chip and the first ECC block; and providing the first clock signal to a second memory interface between the second nonvolatile memory chip and the second ECC block. The second clock signal may be a higher frequency clock signal than the first clock signal. The host interface may communicate with a host according to one of the following standards: Universal Serial Bus (USB), PC Card, CompactFlash card, SmartMedia card, MultiMediaCard, Secure Digital card, a miniSD card, Subscriber Identity Module, Memory Stick, Memory Stick Duo card, or microSD/TransFlash.

According to an embodiment, a memory controller includes: a first memory input/output; a first Error Correction Coding ("ECC") block in communication with the first memory input/output; a second memory input/output; a second ECC block in communication with the second memory input/output; and a host interface in communication with the first ECC block and the second ECC block.

A memory controller may further include: a first clock that provides a first clock signal at a first frequency, the first clock signal provided to the first ECC block and to the second ECC block; and a second clock that provides a second clock signal at a second frequency, the second clock signal provided to the host interface. The second frequency may be higher than the first frequency. The first clock signal may also be provided to the first memory input/output and to the second memory input/output.

A memory controller may comprise: a memory input/output; a first Error Correction Coding ("ECC") block in connection with the memory input/output; a second ECC block in connection with the memory input/output; and a host interface in communication with the first ECC block and the second ECC block.

DETAILED DESCRIPTION OF ILLUSTRATED EMBODIMENTS

Figure 1:
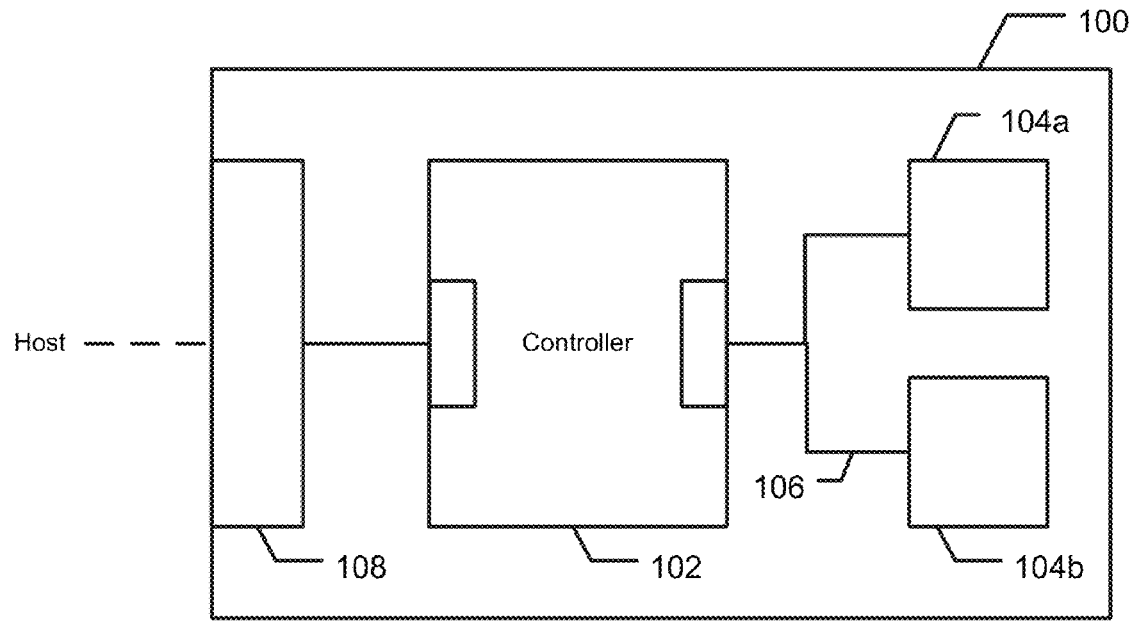
FIG. 1 shows a prior art removable nonvolatile memory system.
Figure 2:
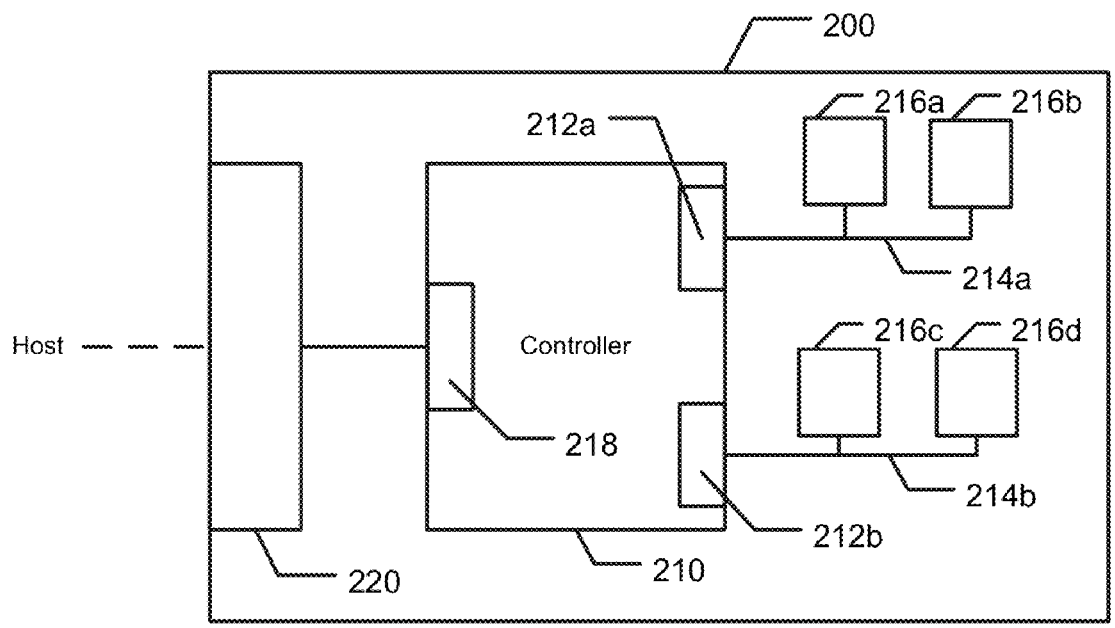
FIG. 2 shows a removable nonvolatile memory system that includes two memory busses and a memory controller that has an interface for each bus.

In contrast to the arrangement of FIG. 1, which shows a prior art memory controller with a single memory interface 108 (sometimes referred to as a Flash Interface Module, or "FIM"), FIG. 2 shows a memory controller 210 that has two memory interfaces 212a, 212b. Each memory interface is shown providing a connection to a different memory bus 214a, 214b, with each bus having two memory dies 216a-d. Memory controller 210 also includes host interface 218 which is connected to the host interface 220 of the memory system 200. However, other arrangements are possible, with different number of interfaces, and different numbers of memory dies per bus. The arrangement of FIG. 2 may facilitate higher speed access to the memory array by allowing a higher degree of parallelism. In other words, both memory interfaces may transfer data in parallel, thus doubling the speed of transfer for a given bus size. In one example, each memory bus has a bus width of 16 bits, so that using two such busses in parallel provides the equivalent of a 32 bit wide bus, but without requiring memory chips that are designed for 32 bit access (i.e. cheaper memory chips with 16 bit access may be used).

To improve performance, the host interface of a memory controller, and the interface portion of a memory system may use protocols that are designed for high speed. For example, increasingly higher clock speeds are used in host interfaces so that data can be transferred more rapidly over a given bus width. One potential bottleneck in such a system that uses a high speed host interface and parallel memory interfaces is within the controller itself. In particular, one potential bottleneck for data passing between the host and the memory array lies in the ECC operations that may be performed as part of such transfer. While ECC operations involved in writing such data are relatively predictable, ECC operations involved in reading such data are not so predictable because they depend on the number of errors in any data read from the memory array. If there are few or no errors, such decoding may be relatively quick. However, if there are many errors, detecting and correcting such errors may be time consuming. Generally, memory systems are designed to guarantee a particular performance for a particular period of time (e.g. warranty period, or some other period). Memory degradation within this time may be relatively predictable and an ECC scheme may be designed to provide specified performance for the predicted error density, at least for the warranty period of the product. However, providing such performance may be costly.

Figure 3:
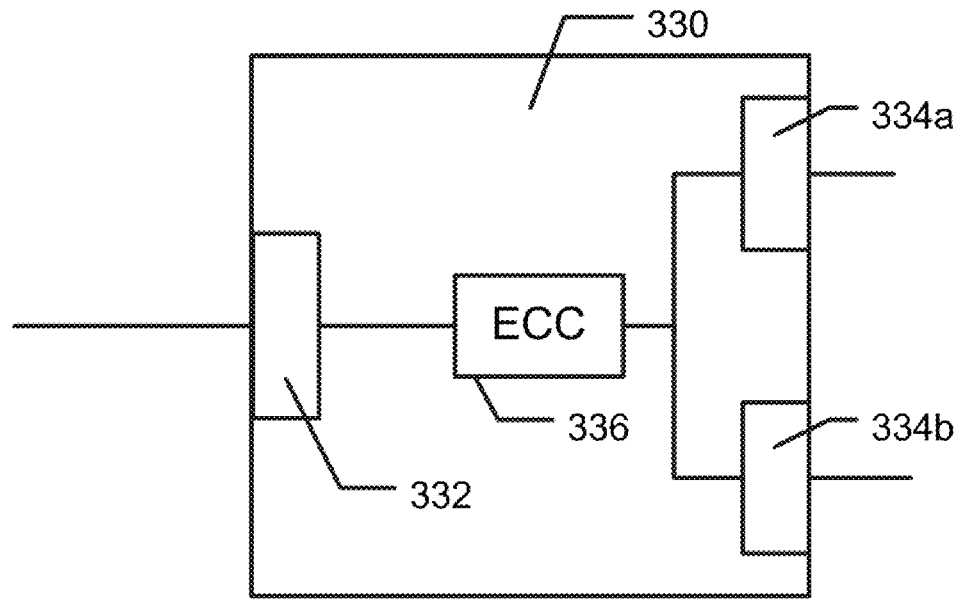
FIG. 3 shows an example of a memory controller that has a single ECC block serving two memory interfaces.

FIG. 3 shows one example of a memory controller 330 that includes a high speed host interface 332 and multiple (two) memory interfaces 334a, 334b. In this example, a single ECC block 336 is used to decode all data read from the memory array. In order to reach a specified performance level using such an ECC block (decoding data from two memory interfaces), a relatively high clock speed may be needed. If the ECC block is not operating at a high enough clock speed, it does not decode data fast enough, and becomes a bottleneck between the memory array and the host.

Figure 4A:
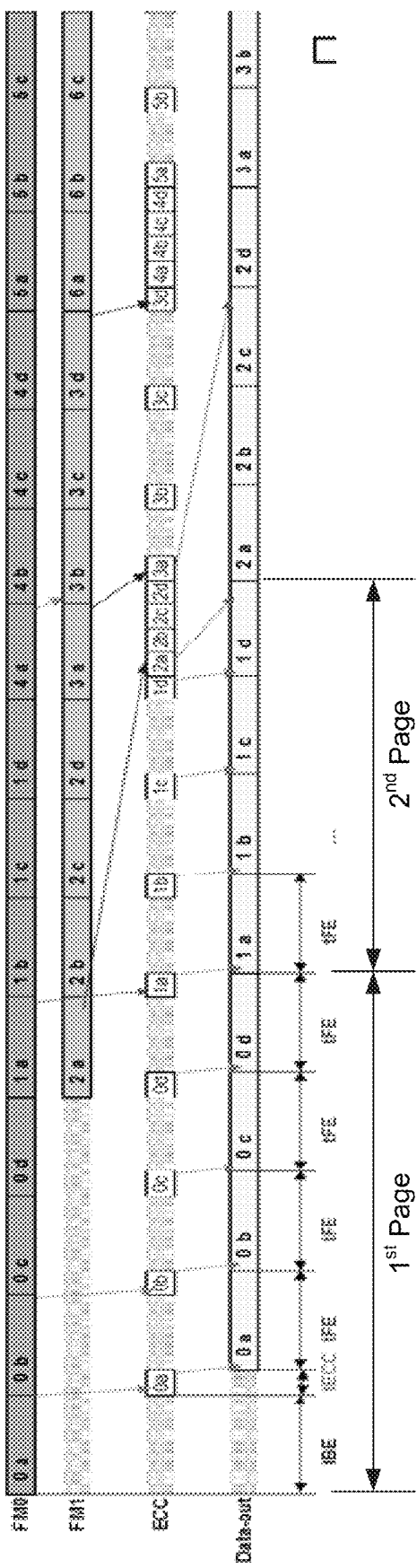
FIG. 4A shows a timing diagram for a memory controller that operates under optimal conditions.

FIG. 4A shows a timing diagram for an ECC block that is well matched to the host interface and memory interfaces to which it is connected. Portions of data are received from two different interfaces (FIM0 and FIM1). Data is decoded by the ECC decoder, one portion at a time, and is output by the host interface as Data-out. The ECC block is operated at a high speed so that a portion of data is decoded in a time (tECC) that is less than the time to output the data to the host (tFE). In this case, the single ECC block is able to handle decoding of data from two different FIMs and so must operate at a higher speed than an ECC block that decodes data from only one FIM (such as shown in FIG. 1). The portions of data shown are units of decoding, sometimes referred to as data blocks, and coding schemes that perform decoding one block at a time may be considered block codes. An example of such a block is 2 KiloBytes of data.

Figure 4B:
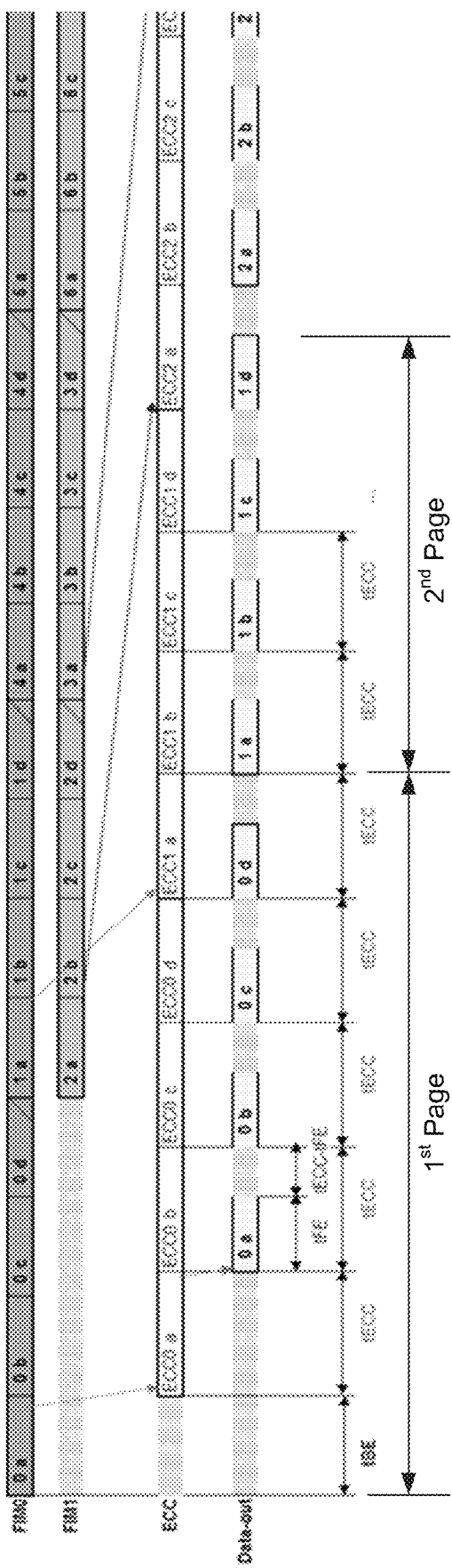
FIG. 4B shows a timing diagram for a memory controller that operates under non-optimal conditions.

FIG. 4B shows a timing diagram for an ECC block that creates a bottleneck between the memory array and the host. Here, ECC decoding of a portion of data takes longer (tECC) than transfer of the data from the memory array to the ECC block (tBE), or transfer of the data from the ECC block to the host (tFE). For example, instead of continuously outputting data, the Data-out timing indicates gaps (tECC-tFE) between outputting portions of data due to delay in the ECC block. The single ECC block used in this example simply cannot keep up with the data supplied by two FIMs and this causes data to be output at a slower speed than the interface is capable of handling.

It should be noted that differences in ECC decoding such as between FIGS. 4A and 4B may occur in the same ECC block, operating in the same memory system, at the same speed, as a result of increased numbers of errors in the data from the memory array. For example, the matching of FIG. 4A may occur early in the life-cycle of a memory system, with the delay of FIG. 4B occurring later in the life-cycle as the number of errors in data read from the memory array increases. Where an ECC block is to provide adequate performance throughout its expected life-cycle, the ECC block may need to be operated at high speed, which may require expensive hardware that can operate at high speeds. Such high speed circuits may not be easy to upgrade from generation to generation (i.e. every time ECC circuits are required to operate at an increased clock speed, some significant design work may be needed). It should also be noted that the figures show ECC operations having uniform durations (tECC) in each example (though different durations from one example to the next). However, in real memories, the time for decoding data may vary from one portion of data to the next. For example, a particular physical area may have some wear or damage that causes errors when data is read from that area. Such data may take longer to decode than data from another area (even a physically adjacent area) that is read as part of the same read operation. ECC blocks are generally designed to deal with worst-case scenarios.

Figure 5:
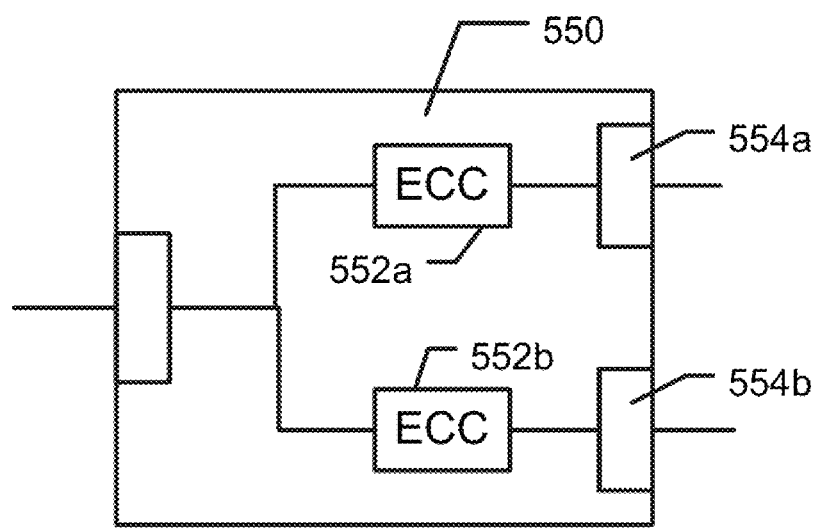
FIG. 5 shows an example of a memory controller that has two ECC blocks, each serving a different memory interface.
Figure 6:
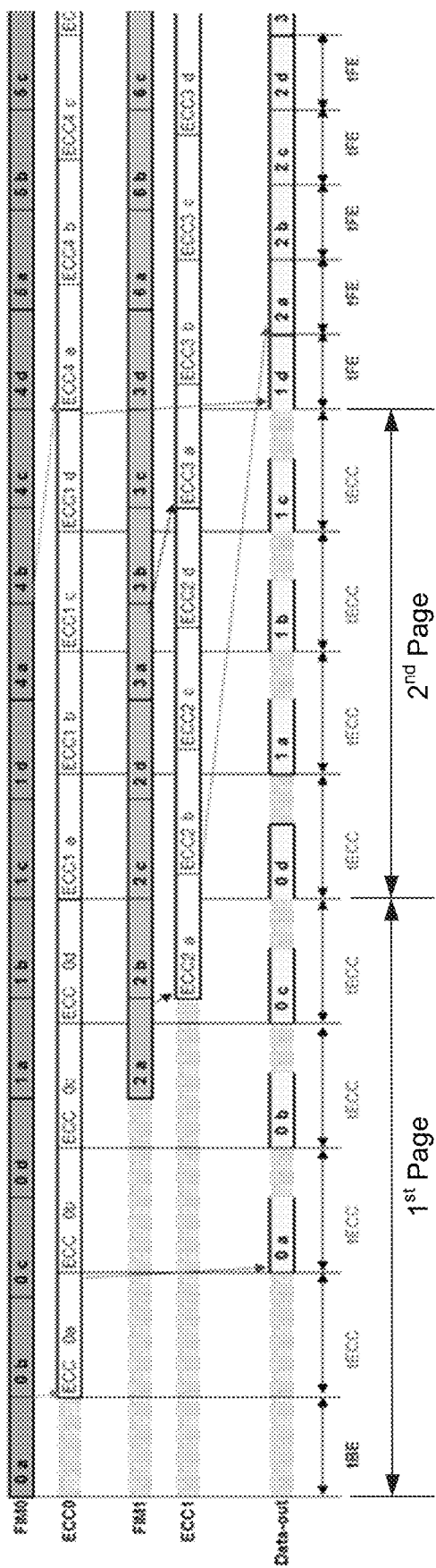
FIG. 6 shows a timing diagram for the memory controller of FIG. 5.

FIG. 5 shows an alternative example of a memory controller 550 that has two ECC blocks 552a, 552b, each one decoding data from one of two memory interfaces 554a, 554b. In this arrangement, each ECC block is dedicated to data from a single memory interface. In such an arrangement, each ECC block decodes data at half the rate that was required of the ECC block of FIG. 3. This may mean that an individual ECC block can be designed to less stringent requirements and can thus be made more cheaply. For example, where the host interface operates at 166 MHz and each of the memory interfaces operate at 80 MHz, the individual ECC blocks may operate at 80 MHz FIG. 6 is a timing diagram that shows the performance of the dual-ECC block arrangement of memory controller 550 FIG. 5. In this example, no bottleneck is created by the relatively slow ECC operation because the two ECC blocks (ECC0 and ECC1) operate in parallel. One ECC block is dedicated to each FIM, ECC0 to FIM0 and ECC1 to FIM1. During an initial period, only FIM0 and ECC0 are operating and the host interface is operating at less than full capacity (approximately half capacity as shown by gaps in Data-out). Then, when FIM1 and ECC1 start to provide data to the interface, the interface operates at full capacity. The data from the two different streams (associated with FIM0 and FIM1 respectively) are interleaved in Data-out. While the time to perform ECC for a particular portion of data (tECC) exceeds the time to output the data (tFE), because there are two ECC blocks operating in parallel, the overall decoding of data occurs at approximately the same speed that the data is sent to the host. Thus, even though each ECC block individually operates slowly (such that one ECC block alone would cause a bottleneck), the combination of the two ECC blocks is adequate to meet the speed of the interfaces.

Figure 7A:
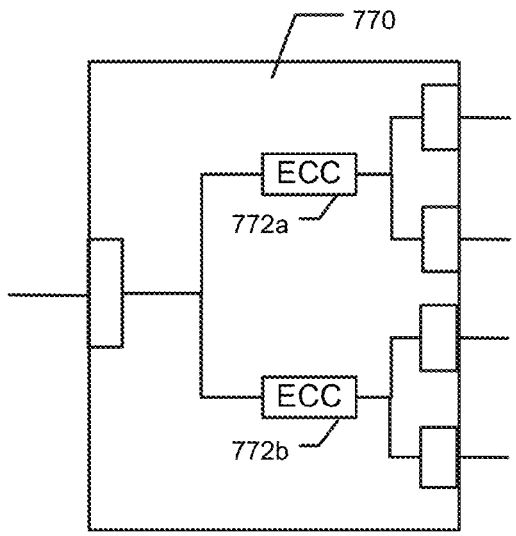
FIG. 7A shows an alternative arrangement in which two ECC blocks each serve two memory interfaces in a four-interface arrangement.

The present invention is not limited to a one-to-one correspondence between ECC blocks and memory interfaces, and may include various other arrangements. For example, FIG. 7A shows an example of a memory controller 770 where two ECC blocks 772a, 772b each decode data from two ECC interfaces 774a-d in a memory controller that has four memory interfaces 774a-d. While ECC blocks in such an arrangement may operate faster than if four separate ECC blocks were provided (e.g. one for each memory interface), such ECC blocks may still operate at a lower clock speed than would be required if a single ECC block were used.

Figure 7B:
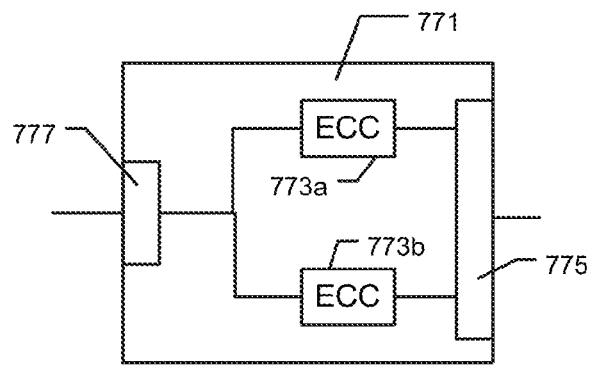
FIG. 7B shows an alternative arrangement in which two ECC blocks serve a single memory interface.

In another example, shown in FIG. 7B, a memory controller 771 includes two separate ECC blocks 773a, 773b, which are both connected to the same memory interface 775. Both ECC blocks 773a, 773b operate in parallel in this example to process data going to and from memory interface 775 (and to/from host interface 777). This may have some advantages over using a single ECC block. For example, an ECC block according to a preexisting design can be used with high-speed interfaces which, if served by a single ECC block, would require a redesigned ECC block. Some redundancy may be provided by having two or more ECC blocks operating in parallel.

In addition to saving costs in redesigning ECC blocks to operate at higher speeds, aspects of the present invention may allow a single clock signal to be used for a number of components on the same chip, which is generally cheaper than providing multiple different clock signals to multiple components. For example, in some cases, the ECC blocks may use the same clock signal as the memory interface, while the host interface may use a higher speed clock signal. Instead of redesigning an ECC block to operate at the increased speed of the host interface, the ECC block may continue to operate at a lower speed, with one or more additional ECC blocks providing additional capacity to match the high speed host interface.

Figure 8:
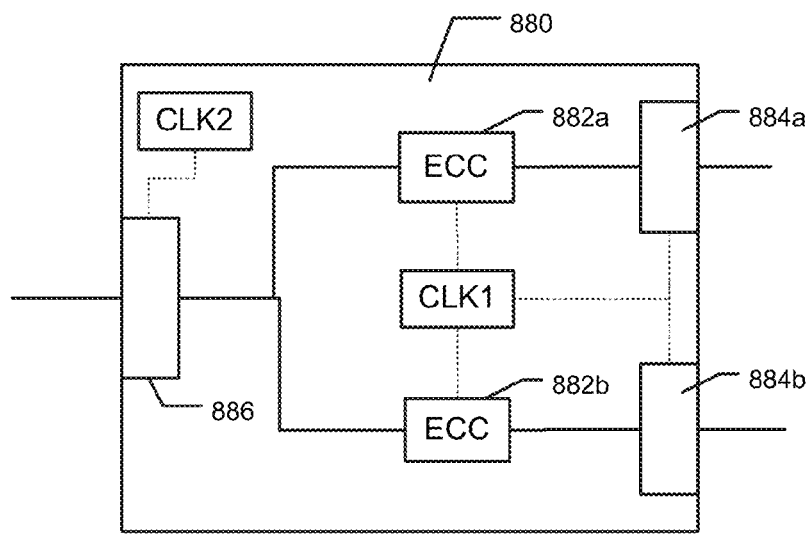
FIG. 8 shows a memory controller having two clocks providing two different clock signals to different parts of the memory controller.

FIG. 8 shows one possible arrangement for clock signals in a memory controller 880 with two ECC blocks 882a, 882b. A first clock signal CLK1 is distributed to the memory interfaces 884a, 884b and to the two ECC blocks 882a, 882b. A second clock signal CLK2 is used for the host interface 886. CLK2 may operate at a higher frequency than CLK1. For example, CLK2 may operate at 166 MHz while CLK1 operates at 100 MHz. To perform ECC decoding at the same speed in a single ECC block could require an ECC block to operate at 200 MHz. Thus, by operating at lower frequencies, the ECC blocks may allow sharing of a clock signal with the memory interfaces and this reduces the number of different clock signals used in the memory controller.

The present invention may be applied to various different ECC technologies and is not limited to any particular encoding/decoding scheme. The above examples show blocks of data being decoded as a unit. In some examples, such a unit comprises 2 KiloBytes (KB) of data. An ECC scheme may be used which can correct up to 42 error bits in such a 2 KB block while maintaining the required performance. For different performance requirements, different ECC schemes may be used. A block-based ECC scheme may use Reed-Solomon or other well known encoding scheme. Alternatively, convolutional coding or other schemes may be used. Additional examples of ECC encoding/decoding schemes and implementation of such ECC schemes in nonvolatile memory systems are described in U.S. Pat. No. 7,546,515, and US Patent Publication Numbers 2008/0092026 and 2007/0266295.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

What is claimed is:

1. A removable nonvolatile memory system comprising:
a first nonvolatile memory chip;
a second nonvolatile memory chip;
a controller chip that has a first memory interface in communication with the first memory chip and a second memory interface in communication with the second memory chip, the first memory interface connected to a first Error Correction Coding ("ECC") block that is dedicated to the first memory interface, and the second memory interface connected to a second ECC block that is dedicated to the second memory interface;
a host interface that is in communication with both the first ECC block and the second ECC block; and
a first clock signal that is provided to the first ECC block and the second ECC block; and
a second clock signal that is provided to the host interface, the second clock signal having a higher frequency than the first clock signal.

2. The removable nonvolatile memory system of claim 1 wherein the removable nonvolatile memory is contained in a memory card.

3. The removable nonvolatile memory system of claim 2 wherein the host interface complies with one of the following standards: PC Card, CompactFlash card, SmartMedia card, MultiMediaCard, Secure Digital card, a miniSD card, Subscriber Identity Module, Memory Stick, Memory Stick Duo card, or microSD/TransFlash.

4. The removable nonvolatile memory system of claim 1 wherein the removable nonvolatile memory is contained in a Universal Serial Bus ("USB") flash drive.

5. The removable nonvolatile memory system of claim 1 wherein the nonvolatile memory forms a Solid State Drive.

6. The removable nonvolatile memory system of claim 1 wherein the first and second nonvolatile memory chips are NAND flash memory chips.

7. The removable nonvolatile memory system of claim 1, wherein the first clock signal is provided to the first memory interface and the second memory interface.

8. A method of performing error correction in a removable nonvolatile memory system comprising:
receiving a first stream of encoded data from a first nonvolatile memory chip in the removable nonvolatile memory system;
providing the first stream of encoded data to a first Error Correction Coding ("ECC") block on a controller chip in the removable nonvolatile memory system;
decoding the first stream of data in the first ECC block to obtain a first stream of decoded data;
providing the first stream of decoded data to a host interface of the removable nonvolatile memory system;
receiving a second stream of encoded data from a second nonvolatile memory chip in the removable nonvolatile memory system;
providing the second stream of encoded data to a second ECC block on the controller chip;
decoding the second stream of data in the second ECC block to obtain a second stream of decoded data;
providing the second stream of decoded data to the host interface;
providing a first clock signal to the first ECC block and to the second ECC block; and
providing a second clock signal to the host interface, wherein the second clock signal is a higher frequency clock signal than the first clock signal.

9. The method of claim 8 further comprising:
providing the first clock signal to a first memory interface between the first nonvolatile memory chip and the first ECC block; and
providing the first clock signal to a second memory interface between the second nonvolatile memory chip and the second ECC block.

10. The method of claim 8 wherein the host interface communicates with a host according to one of the following standards: Universal Serial Bus (USB), PC Card, CompactFlash card, SmartMedia card, MultiMediaCard, Secure Digital card, a miniSD card, Subscriber Identity Module, Memory Stick, Memory Stick Duo card, microSD/TransFlash, AT-Attachment (ATA), Serial ATA (SATA), Parallel ATA (PATA), Peripheral Component Interconnect (PCI), mini-PCI, or Firewire.

11. A memory controller comprising:
a first memory input/output;
a first Error Correction Coding ("ECC") block in communication with the first memory input/output;
a second memory input/output;
a second ECC block in communication with the second memory input/output;
a host interface in communication with the first ECC block and the second ECC block a first clock that provides a first clock signal at a first frequency, the first clock signal provided to the first ECC block and to the second ECC block; and
a second clock that provides a second clock signal at a second frequency, the second clock signal provided to the host interface, wherein the second frequency is higher than the first frequency.

12. The memory controller of claim 11, wherein the first clock signal is provided to the first memory input/output and to the second memory input/output.

* * * * *